US009358872B2

United States Patent
Nefcy et al.

(10) Patent No.: US 9,358,872 B2
(45) Date of Patent: Jun. 7, 2016

(54) CONTROLLING A POWERTRAIN AND A CLUTCH OF A VEHICLE

(75) Inventors: Bernard D. Nefcy, Novi, MI (US); Daniel Scott Colvin, Farmington Hills, MI (US); Mark Steven Yamazaki, Canton, MI (US); Marvin Paul Kraska, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 658 days.

(21) Appl. No.: 13/613,310

(22) Filed: Sep. 13, 2012

(65) Prior Publication Data

US 2013/0297108 A1 Nov. 7, 2013

Related U.S. Application Data

(60) Provisional application No. 61/643,723, filed on May 7, 2012.

(51) Int. Cl.

| | |
|---|---|
| *B60L 9/00* | (2006.01) |
| *B60L 11/00* | (2006.01) |
| *G05D 1/00* | (2006.01) |
| *G05D 7/00* | (2006.01) |
| *G06F 7/00* | (2006.01) |
| *G06F 17/00* | (2006.01) |
| *B60K 6/48* | (2007.10) |
| *B60W 10/08* | (2006.01) |
| *B60W 10/02* | (2006.01) |

(Continued)

(52) U.S. Cl.
CPC ............... *B60K 6/48* (2013.01); *B60W 10/023* (2013.01); *B60W 10/06* (2013.01); *B60W 10/08* (2013.01); *F16H 61/143* (2013.01); *B60W 2510/0241* (2013.01); *B60W 2710/028* (2013.01); *B60W 2710/081* (2013.01); *B60W 2710/1083* (2013.01); *F16H 2061/145* (2013.01); *Y02T 10/6221* (2013.01); *Y02T 10/6286* (2013.01)

(58) Field of Classification Search
CPC ... B60W 10/02; B60W 10/023; B60W 10/04; B60W 10/06; B60W 10/08; B60W 20/00; B60W 30/18; B60W 2710/028; B60W 2710/081; B60W 2710/1083; B60W 2510/0241; F16D 48/02; F16H 61/14; F16H 61/143; F16H 2061/145; B60K 6/48; Y02T 10/6221; Y02T 10/6286
USPC .................... 701/22, 51; 477/3, 5, 57, 62, 65; 903/930; 180/65.23, 65.265
See application file for complete search history.

(56) References Cited

U.S. PATENT DOCUMENTS

| | | | |
|---|---|---|---|
| 7,351,182 B2 * | 4/2008 | Kobayashi | 477/5 |
| 7,896,114 B2 * | 3/2011 | Colvin et al. | 180/65.28 |
| 2005/0082098 A1 * | 4/2005 | Ito et al. | 180/65.2 |

(Continued)

*Primary Examiner* — James Trammell
*Assistant Examiner* — Rachid Bendidi
(74) *Attorney, Agent, or Firm* — David B. Kelley; Brooks Kushman P.C.

(57) ABSTRACT

A vehicle includes an engine and is at least partially propelled by a fraction battery and a traction motor. A clutch is configured to be coupled to the traction motor. An electrical and/or mechanical pump provides pressure to control the clutch. At least one controller determines if the clutch is slipping. In response to the clutch slipping, the at least one controller commands an increase in speed of an input of the clutch such that the available line pressure to control the slipping of the clutch is increased. The line pressure is then applied to the clutch in order to control the slipping of the clutch.

15 Claims, 5 Drawing Sheets

(51) Int. Cl.
   *B60W 10/06*   (2006.01)
   *F16H 61/14*   (2006.01)

(56) References Cited

U.S. PATENT DOCUMENTS

| | | | |
|---|---|---|---|
| 2006/0272869 A1* | 12/2006 | Hidaka et al. | 180/65.2 |
| 2007/0102211 A1* | 5/2007 | Nozaki et al. | 180/65.7 |
| 2007/0259755 A1* | 11/2007 | Tanishima | 477/3 |
| 2007/0278022 A1* | 12/2007 | Tanishima | 180/65.2 |
| 2008/0066457 A1* | 3/2008 | Kim | 60/286 |
| 2009/0234524 A1* | 9/2009 | Kim | 701/22 |
| 2010/0075798 A1* | 3/2010 | Suzuki et al. | 477/5 |
| 2010/0250037 A1 | 9/2010 | Yoshida et al. | |
| 2010/0304923 A1* | 12/2010 | Schenk et al. | 477/5 |
| 2011/0118078 A1* | 5/2011 | Kraska et al. | 477/5 |
| 2011/0118915 A1 | 5/2011 | Ortmann et al. | |
| 2011/0320077 A1* | 12/2011 | Choi | 701/22 |
| 2012/0078457 A1* | 3/2012 | Tajima et al. | 701/22 |
| 2012/0202646 A1* | 8/2012 | Suzuki et al. | 477/5 |

* cited by examiner

CONTROLLING A POWERTRAIN AND A CLUTCH OF A VEHICLE

CROSS-REFERENCE TO RELATED APPLICATIONS

This application claims the benefit of U.S. Provisional Application No. 61/643,723, filed May 7, 2012, the disclosure of which is incorporated in its entirety by reference herein.

TECHNICAL FIELD

The present disclosure relates to the control of a powertrain in a hybrid electric vehicle.

BACKGROUND

Hybrid electric vehicles (HEV's) include an internal combustion engine, an electric traction motor, and a traction battery. The engine can be connected to the motor in parallel or in series. A torque converter and/or launch clutch can couple the engine and motor to a transmission to transmit torque to wheels. When the vehicle is under relatively large loads or is traveling on an incline, the required torque to propel the vehicle is increased.

SUMMARY

According to one embodiment, a method is provided for controlling a vehicle. A current supplied to an electric machine is altered. The electric machine is coupled to wheels via a locked clutch. The altered current alters a torque output of the electric machine. In response to a slipping of the clutch due to the altered torque output, a speed of an input of the clutch is increased in order to increase a line pressure available to the clutch. In further response to the slipping of the clutch, the line pressure is applied to control the slipping of the clutch.

According to another embodiment, a vehicle includes an electric machine. A clutch is configured to be coupled to the electric machine. At least one controller is provided to respond to a slipping of the clutch. In response to the slipping, the controller is configured to increase a speed of an input of the clutch beyond a threshold speed such that an available line pressure to control the slipping of the clutch is increased.

According to yet another embodiment, a method for controlling a vehicle driveline is provided. A current to an electric machine is altered, wherein the electric machine is coupled to wheels via a locked clutch. The altering of the current alters a torque output of the electric machine. In response to a slipping of the clutch due to the altered torque output, the engine is started to increase a line pressure available to the clutch, and the line pressure is applied to control the slipping of the clutch.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
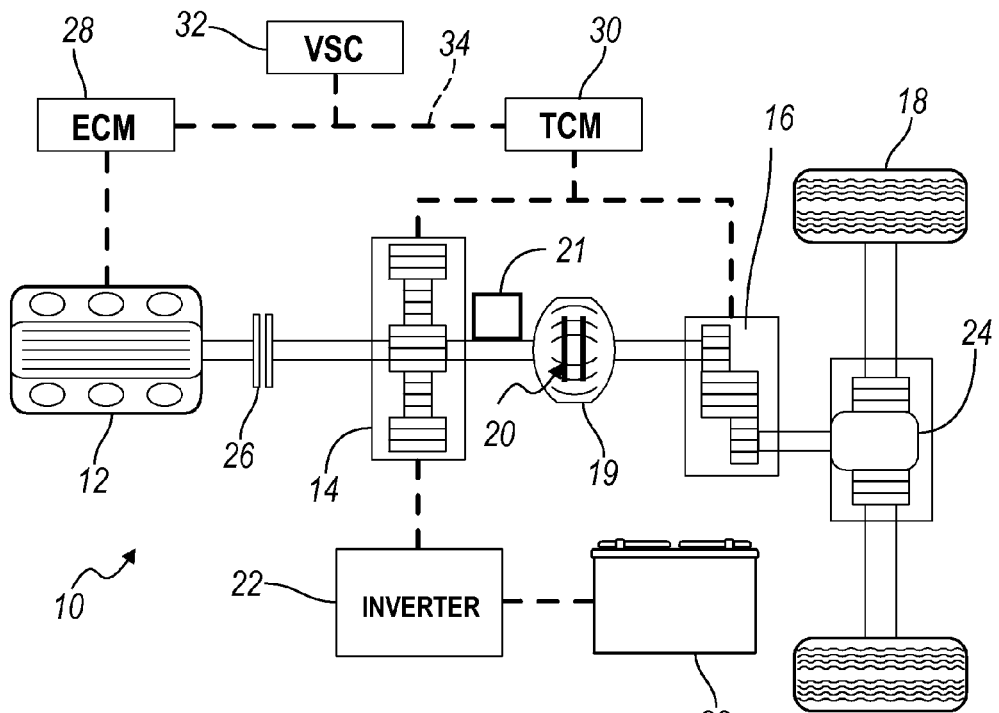
FIG. 1 is a schematic illustration of a powertrain of a hybrid electric vehicle.

Referring to FIG. 1, a schematic diagram of a vehicle 10 is illustrated according to one embodiment of the present disclosure. The vehicle 10 is an HEV. The powertrain or driveline of the vehicle 10 includes an engine 12, an electric machine or motor/generator (M/G) 14, and a transmission 16 disposed between the M/G 14 and wheels 18. A torque converter 19 can optionally be provided between the M/G 14 and the transmission 16. The torque converter 19 transfers rotating power from the M/G 14 to the transmission 16. The torque converter 19 can include a bypass clutch that, when commanded, will transfer power from the M/G 14 to the remaining downstream components of the driveline while bypassing the torque converter 19. A launch clutch 20 can also be provided, and can be disposed downstream of the M/G 14 in place of the torque converter 19. When the launch clutch 20 is disengaged, the torque and rotational speed from the M/G 14 is not transferred to the transmission 16, and when the launch clutch is at least partially engaged, torque is transferred to the transmission 16. An auxiliary pump 21 is provided to pump fluid and control the launch clutch 20. It should be understood that instead of a torque converter 19, one or more clutches can be provided to selectively transfer torque from the M/G 14 to the transmission 16. Other configurations are also possible.

The M/G 14 can operate as a generator by receiving torque from the engine 12 and supplying AC voltage to an inverter 22. The inverter 22 converts the AC voltage into DC voltage to charge a traction battery, or battery 23. The M/G 14 can operate as a generator by utilizing regenerative braking to convert the braking energy of the vehicle 10 into electric energy to be stored in the battery 23. Alternatively, the M/G 14 can operate as a motor by receiving current or power from the inverter 22 and battery 23, and providing torque through the torque converter 19, the transmission 16 and ultimately to the wheels 18. The battery 23 can also power the pump 21, or the pump 21 can be powered from an auxiliary battery (not shown) of the vehicle 10. A differential 24 can be provided to distribute torque from the output of the transmission 16 to the wheels 18.

A first clutch, or disconnect clutch 26, is located between the engine 12 and the M/G 14. The disconnect clutch 26 can be fully open, partially engaged, or fully engaged (locked). In order to start the engine 12, the M/G 14 rotates the engine 12 when the disconnect clutch 26 is at least partially engaged. Once the engine 12 is rotated by the M/G 14 to a certain speed (e.g., ~100-200 rpm), fuel entry and ignition can commence. This enables the engine 12 to "start" and to provide torque back to the M/G 14; the M/G 14 can charge the battery 23 and/or distribute torque from the engine 12 to the torque converter 19, through the transmission 16 and ultimately to the wheels 18. In another embodiment, a separate engine starter motor (not shown) can be provided.

The vehicle 10 also includes a control system, shown in the embodiment of FIG. 1 as three separate controllers: an engine control module (ECM) 28, a transmission control module (TCM) 30, and a vehicle system controller (VSC) 32. The ECM 28 is directly connected to the engine 12, and the TCM 30 can be connected to the M/G 14 and the transmission 16. The three controllers 28, 30, 32 are connected to each other via a controller area network (CAN) 34. The VSC 32 commands the ECM 28 to control the engine 12 and the TCM 30 to control the M/G 14 and the transmission 16. Although the control system of the vehicle 10 includes three separate controllers, such a control system can include more or less than three controllers, as desired. For example, a separate motor control module can be directly connected to the M/G 14 and to the other controllers in the CAN 34. Furthermore, it should be understood that references in the present disclosure to certain functions performed by the VSC 32 can be commanded by at least one of the ECM 28 and/or the TCM 30.

As previously described, the M/G 14 is utilized to start the engine 12. This is referred to as engine pull-up. It can be advantageous to pull-up the engine 12 in order to spin the M/G 14 and charge the battery 23, for example. It can also be advantageous to pull-up the engine 12 to satisfy acceleration demands. During engine pull-up, the disconnect clutch 26 is at least partially engaged, and torque from the M/G 14 is applied through the disconnect clutch 26 and to the engine 12. Once the engine 12 is pulled-up, a boost of torque can be provided through the powertrain due to, for example, sudden ignition in the engine 12. The increase in speed of the engine after engine pull-up can be translated into increased rotational speed of the M/G 14 and increased available line pressure in the pump 21 to control the clutch 20. Increased rotational speed of the M/G 14 can also cause the battery 23 to be charged and/or more torque to be applied to the torque converter 19, as previously described. Once the battery 23 is sufficiently charged and the vehicle 10 does not require engine power for propulsion, the engine 12 can be disabled or pulled-down.

Figure 2:
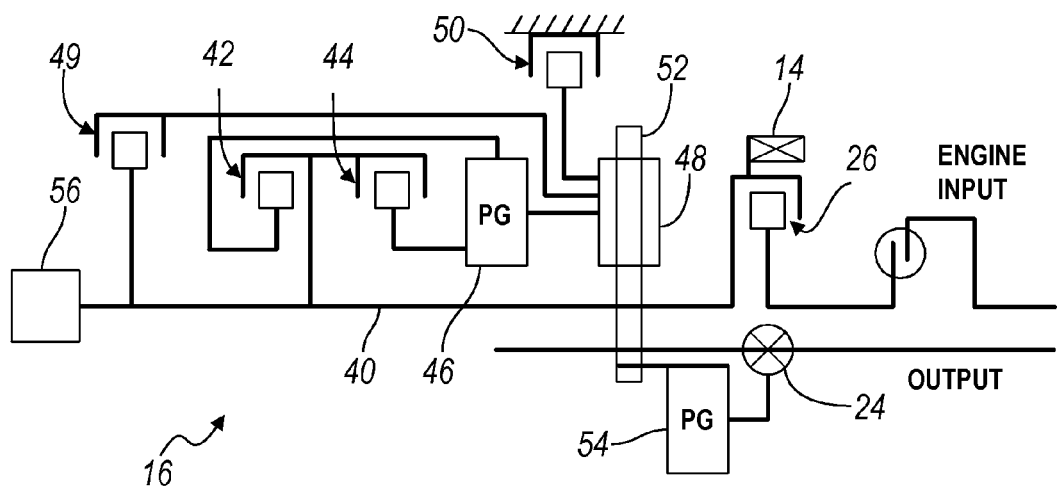
FIG. 2 is a schematic illustration of a transmission and other powertrain components.

Referring to FIG. 2, the transmission 16 is shown in detail. It should be understood that FIG. 2 merely exemplifies one configuration of a transmission 16. In a vehicle 10 utilizing the exemplified configuration of FIG. 2, a torque converter may not be needed in the vehicle, due to the multiple clutches and planetary gear sets within the transmission. If a torque converter is not utilized in a configuration, then references to a "lockup clutch" or "launch clutch" include any clutch in the transmission capable of at least partially isolating the wheels 18 from the M/G 14. It should therefore be understood that a simplified version of the transmission 16 can be utilized in combination with a torque converter 19, in which fewer clutches and planetary gear sets are needed within the transmission 16. Several other embodiments are contemplated with various configurations of clutches and/or planetary gear sets, with or without the use of a torque converter, as known in the art.

The transmission 16 of FIG. 2 includes an input shaft 40 that receives torque from the engine 12 and the M/G 14 either separately or in combination. The input shaft 40 is operatively connected to a second clutch 42 and a third clutch 44. A portion of each of the second clutch 42 and third clutch 44 is connected to a first planetary gear set (PG) 46, which is connected to a second planetary gear set (PG) 48. A reverse clutch, or fourth clutch 49 and a low-and-reverse brake, or fifth clutch 50 can also be connected to the PG 48. The second PG 48 drives a belt or chain 52 to transmit power to a third planetary gear set (PG) 54. Each of the planetary gear sets 46, 48, 54 can include a sun gear, a ring gear, and a planetary carrier to provide various gear ratios in the transmission 16. The third PG 52 provides a final gear ratio to transmit torque from the transmission 16 to the differential 24.

A main pump 56 provides pressure to each of the clutches to engage/disengage each clutch as dictated by the TCM 30. It should be understood that one or more of the clutches 42, 44, 49, 50 can be controlled to be engaged (locked), partially engaged, or fully disengaged, similar to the operation of the launch clutch 20 and the disconnect clutch 26. For example, when the second clutch 42 and/or the third clutch 44 are disengaged, the transmission 16 can be isolated from the M/G 14 such that no torque is transmitted through the transmission 16 and to the wheels 18. It should also be understood that while clutches 42, 44 are illustrated as being a part of the transmission 16, one or more clutches can be separately utilized between the M/G 14 and the transmission 16 instead of being integral with the transmission 16.

Referring to FIGS. 1 and 2, a "locked electric launch" or "locked launch" is defined as an acceleration (or attempted acceleration) of the vehicle 10 while the launch clutch 20 is locked. During a locked launch, the M/G 14 increases in speed to correspondingly increase the speed of a turbine in the torque converter 19. This increase in speed of the turbine correspondingly adds torque to the wheels 18 to propel the vehicle 10. The engine 12 can be started via the M/G 14 while the launch clutch 20 is locked during a locked launch. Any torque from the engine 12 and/or M/G 14 transfers to the transmission 16 while the launch clutch 20 is locked.

Figure 3:
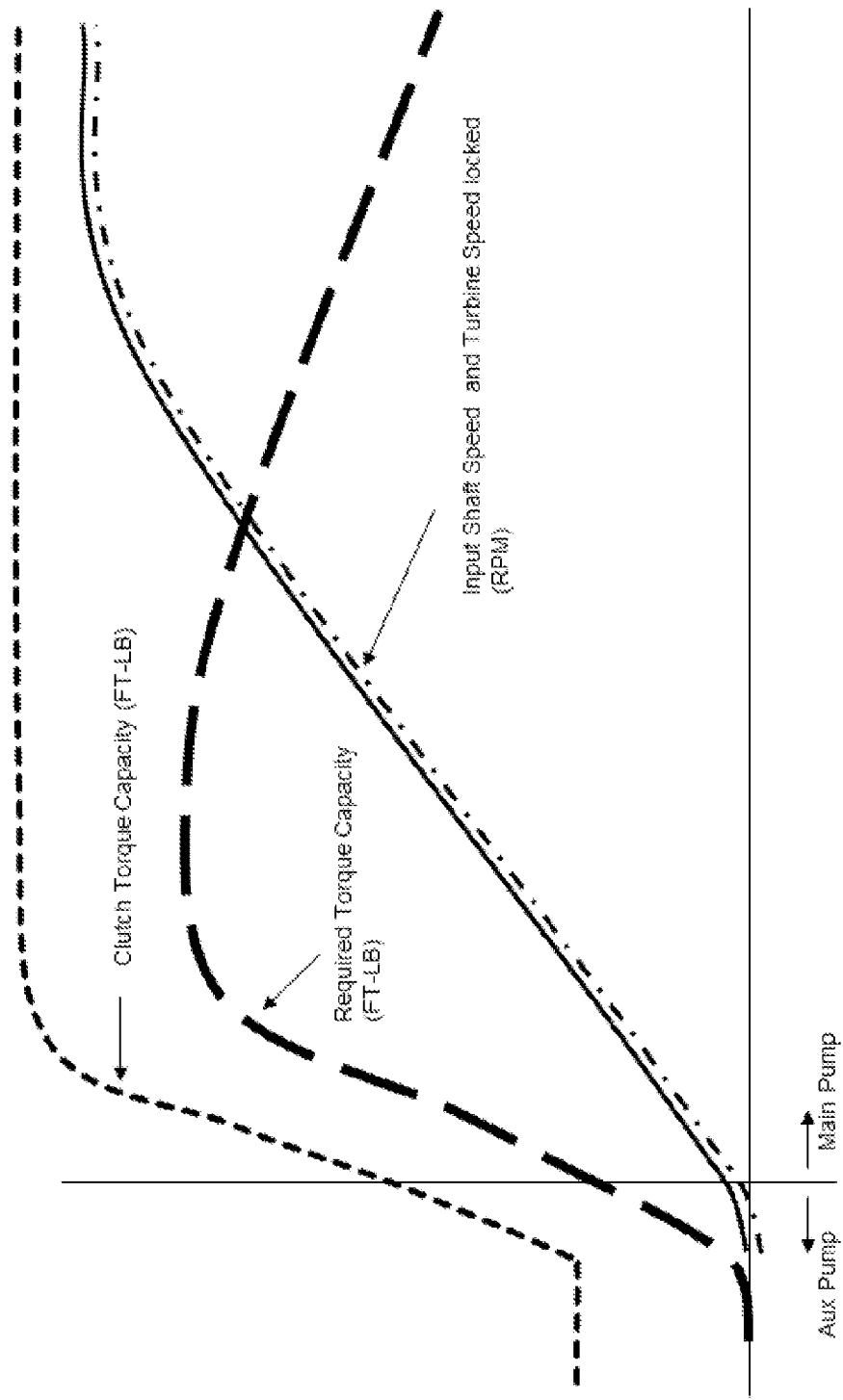
FIG. 3 is a graphical representation of various torques and speeds during a locked vehicle launch in which a launch clutch is not slipping.

Referring to FIGS. 1 and 3, a locked launch is exemplified while the vehicle 10 is operating under normal conditions without a relatively large tow load or on a relatively large incline. The clutch torque capacity is defined by the pressure available for the launch clutch 20 as operated by the auxiliary pump 21 and/or main pump 56. The required torque capacity is defined as the torque that is required to accelerate the torque converter 19 and thus accelerate the vehicle 10 from stopped. In FIG. 3, as there are no large external loads, for example, the M/G 14 can provide the necessary torque to accelerate the vehicle 10 as desired. Furthermore, because the clutch torque capacity exceeds the required torque capacity, power from the engine 12 is unnecessary to fulfill acceleration demands. While the launch clutch 20 is locked during acceleration, the speed of an input shaft to the clutch 20 is proportional to the speed of the output of the clutch 20.

Figure 4:
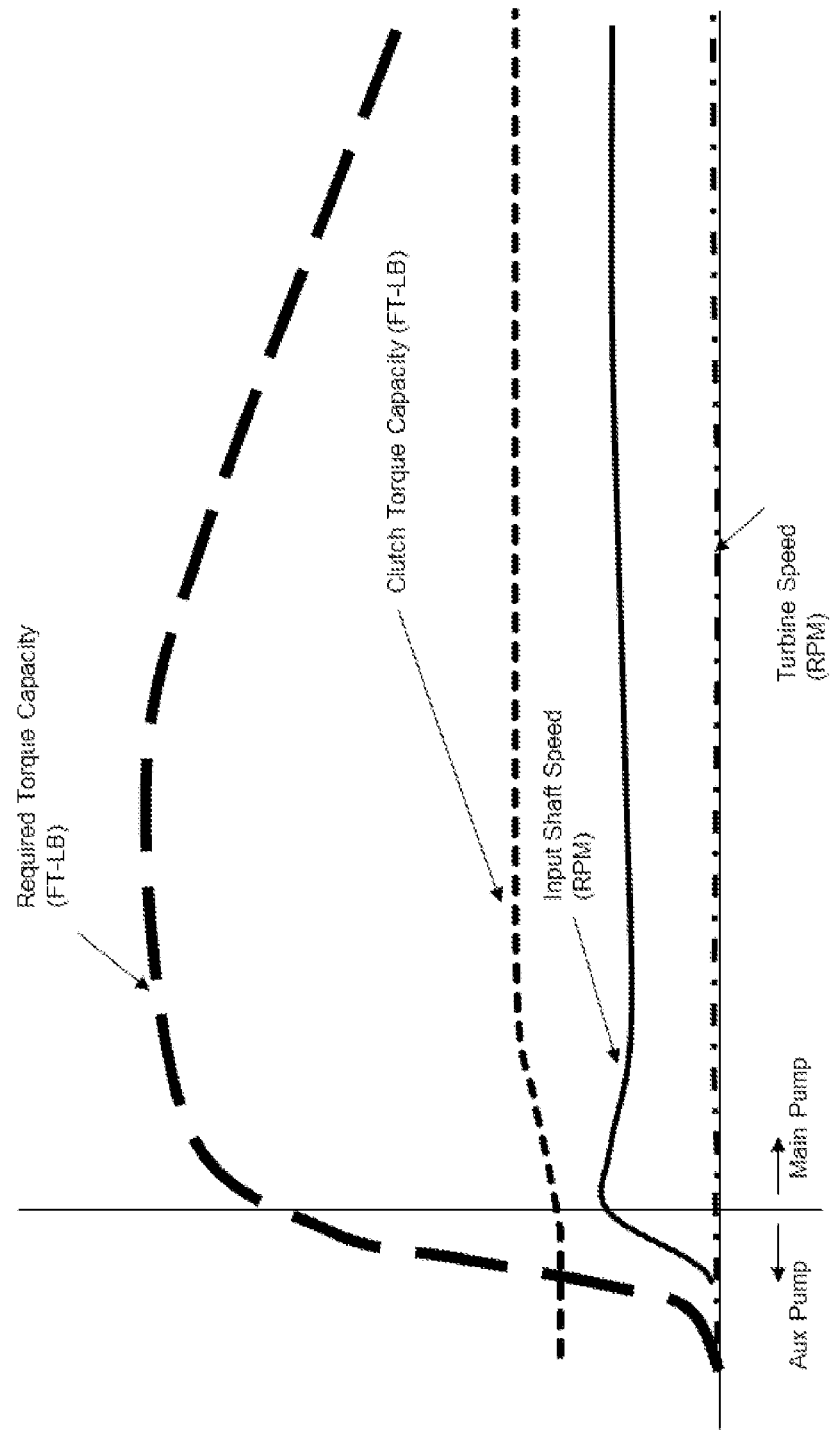
FIG. 4 is a graphical representation of various torques and speeds during an attempted locked vehicle launch in which the launch clutch is slipping.

Referring to FIGS. 1 and 4, an attempted launch of the vehicle 10 is illustrated when the vehicle 10 is under relatively large tow load or is traveling on a relatively steep incline. Due to the large load or incline, the launch clutch 20 remains locked while the vehicle is stopped. As the vehicle 10 is commanded to accelerate, the speed and torque in the M/G 14 increases in an attempt to turn the turbine of the torque converter 19. The torque capacity of the launch clutch 20 is reduced due to the lower available line pressure from the auxiliary pump 21. Because the required torque capacity to accelerate the vehicle 10 is larger than the clutch torque capacity, the launch clutch 20 begins to slip, in which the input of the clutch 20 spins while the output of the clutch 20 remains generally motionless. The transferred torque from the M/G 14 to the launch clutch 20 is less than the required amount to rotate the transmission 16 and ultimately the wheels 18. The combination of the available pressure from the pumps 21, 56 and the power from the M/G 14 cannot meet the required torque capacity to propel the vehicle 10. Therefore, the vehicle 10 remains motionless and the launch clutch 20 continues slipping. The VSC 32 continues to command the M/G 14 to provide torque to launch clutch 20, but the load and/or incline subjected on the vehicle 10 is too great and thus the M/G 14 cannot sufficiently power the transmission 16 to turn the wheels 18.

Figure 5:
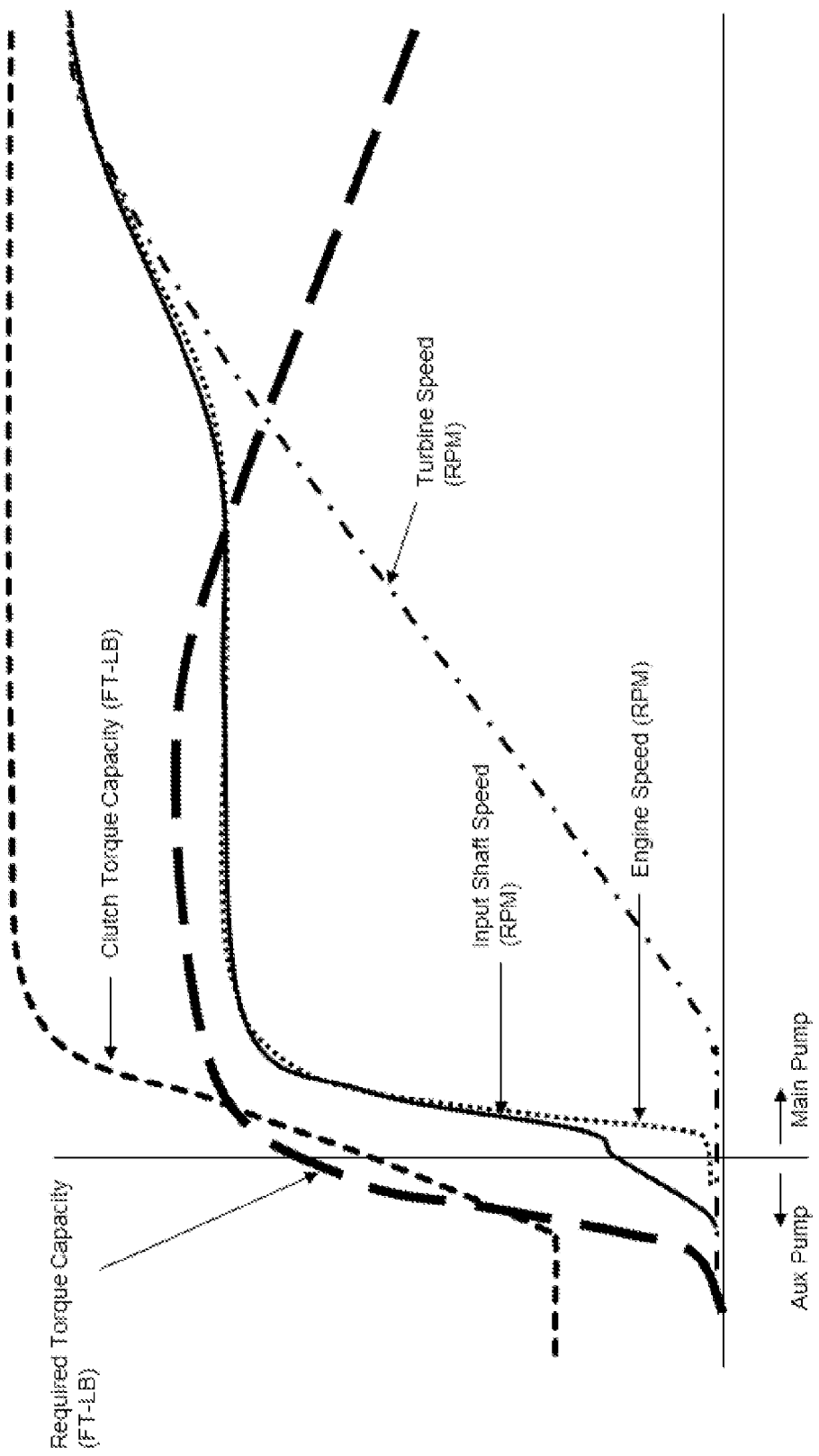
FIG. 5 is a graphical representation of various torques and speeds as the launch clutch is enabled to slip.

Referring to FIGS. 1 and 5, a commanded "slipping start" is illustrated. The vehicle 10 is again under large loads or is on a relatively large incline. A locked launch begins. The M/G 14 and the pressure available from the auxiliary pump 21 is initially not enough to exceed the required torque capacity and propel the vehicle 10. Since the required torque capacity exceeds the clutch torque capacity, the launch clutch 20 begins to slip. This causes the input shaft of the clutch 20 to spin while the output of the clutch 20 remains generally motionless. The VSC 32 detects the slipping of the clutch. Instead of commanding the M/G 14 to continue to attempt to provide enough torque to propel the vehicle, the VSC 32 enables the launch clutch 20 to slip (or commands the launch clutch 20 to continue slipping) by reducing pressure in the launch clutch. In response to the launch clutch 20 slipping, the VSC 32 commands the M/G 14 to pull-up the engine 12, or if already pulled-up, commands the engine 12 to increase its output power. An increase in torque to the clutch 20 (or torque converter 19) may thus be provided due to the torque boost from the engine 12. Once the rotational speed of the input of the clutch 20 has been increased beyond a threshold speed, the speed is sufficient to generate the available line pressure in the pump 21 to control the slipping of the clutch. Once the threshold speed has been reached and the slipping can be controlled, the VSC 32 can command the clutch 20 to remain slipping while the engine 12 is providing power. The boost in torque from the engine 12 can meet the required torque capacity to propel the vehicle 10. This can be referred to as a "slipping launch" rather than a locked launch. The VSC 32 can command a slipping launch based upon the torque output by the M/G 14 being insufficient, as indicated by the detected slipping of the launch clutch 20.

Once the engine 12 has increased its torque output, the disconnect clutch 26 can be locked such that the engine 12 provides more torque to the torque converter 19. The clutch torque capacity thus increases above the required torque capacity to propel the vehicle 10. The turbine speed begins to increase, transmitting torque through the transmission 16 and to the wheels 18.

It should be understood that the references made to detecting slipping of the clutch 20 may include comparing a rotational speed the input and output of the clutch 20. Sensors can be provided adjacent to the M/G 14 or the input of the clutch 20 to sense the rotational speed of the input of the clutch 20. Similarly, rotational speed sensors can be provided near the output of the clutch 20. A slip may be detected if the clutch input rotational speed is less than the clutch output rotational speed. It should further be understood that slipping can be detected by the VSC 32 by sensing the pressure in the clutch 20 and comparing the pressure to the estimated pressure necessary to lock the clutch 20. Numerous other configurations can be provided in which the slipping is detected in the clutch 20.

In one embodiment, the VSC 32 detects a slipping in the launch clutch 20 after an attempted locked electric launch. In response to the slipping of the clutch 20, the VSC 32 commands an increase in speed of the input of the clutch 20 in order to increase a line pressure available to the clutch 20. The increase in speed of the input of the clutch 20 can be accomplished by increasing a torque output of the engine 12, or by reducing clutch pressure in the clutch 20 (allowing more slipping). The increase in speed of the input of the clutch 20 increases a speed of the pump 21 such that the available line pressure is increased. In further response to the slipping of the clutch 20, the VSC also applies the increased line pressure to assertively control the slipping of the clutch 20.

Figure 6:
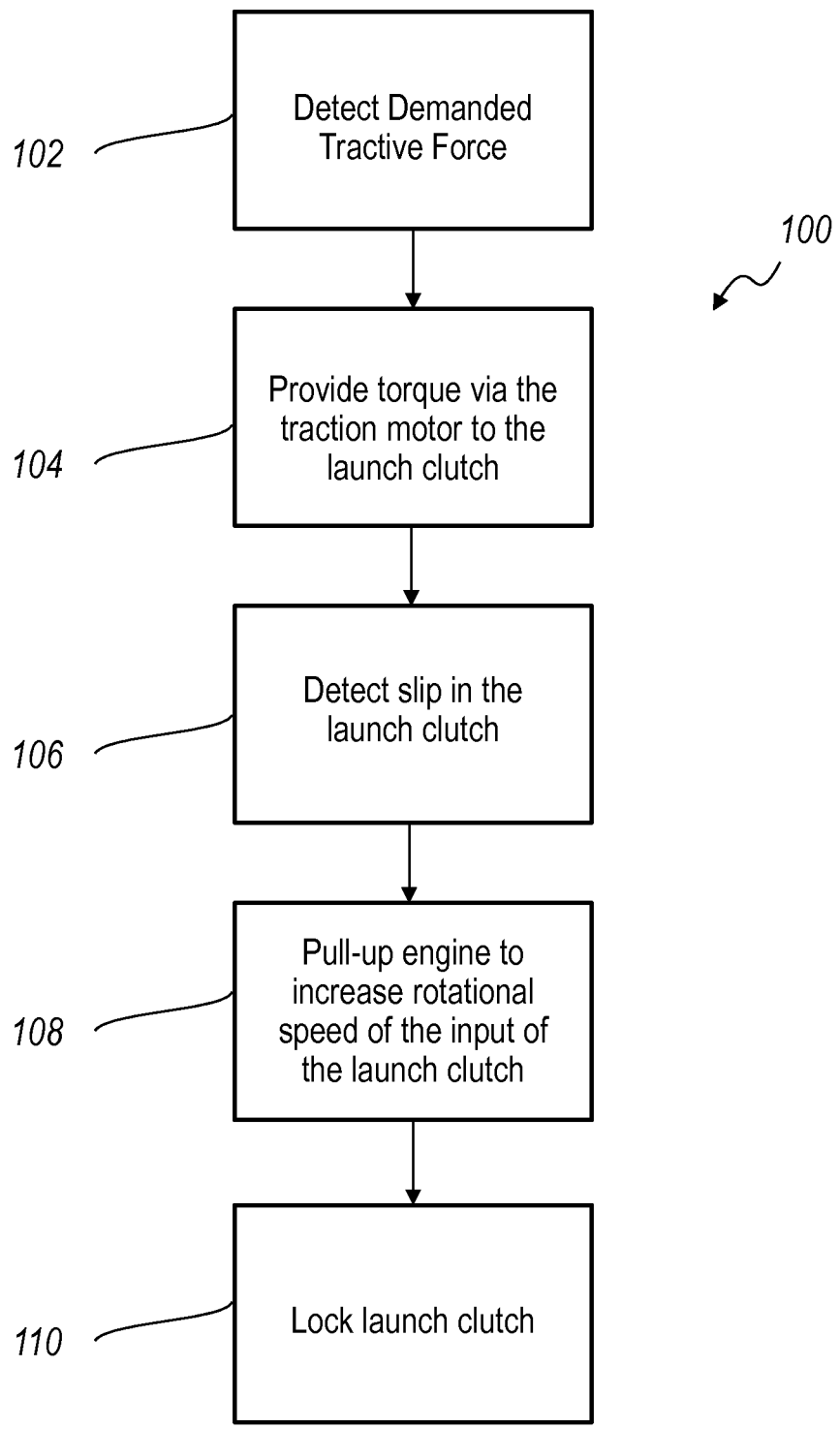
FIG. 6 is a flow chart of an algorithm implemented by a control system in the vehicle.

Referring to FIGS. 1 and 6, a method of providing sufficient torque to propel a vehicle subjected to high loads or inclined travel is illustrated at 100. At operation 102, a demanded acceleration or deceleration is detected, for example, by sensing a vehicle occupant pressing the acceleration pedal or brake pedal. At operation 104, in response to the demanded tractive force, a locked launch is attempted in which the current supplied to the M/G 14 is altered to alter the torque output of the M/G 14 and thus the torque provided to a clutch, such as the launch clutch 20. At operation 106, slip is detected in the launch clutch 20 by methods previously explained. At operation 108, the VSC commands a slipping start in which the launch clutch 20. The engine 12 is pulled-up, to increase the rotational speed of the input of the launch clutch 20. Shortly thereafter, the torque capacity in the launch clutch 20 exceeds the required torque capacity to propel the vehicle 10. At operation 110, once sufficient torque is provided to the launch clutch 20, the VSC 32 can command the launch clutch 20 to lock, which increases the torque provided to the transmission 16 and to the wheels 18.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method for controlling a vehicle comprising:
by a controller, altering a current to an electric machine coupled to wheels via a locked clutch to alter a torque output of the electric machine; and
by the controller, in response to a slipping of the clutch due to the altered torque output, (i) increasing a speed of an input of the clutch to increase a line pressure available to the clutch and (ii) applying the line pressure to control the slipping of the clutch.

2. The method of claim 1, wherein increasing the speed of the input of the clutch includes increasing torque input to the clutch.

3. The method of claim 2, wherein increasing the torque input to the clutch includes starting an engine coupled to the input of the clutch.

4. The method of claim 1, wherein increasing the speed of the input of the clutch includes reducing a pressure of the clutch.

5. The method of claim 1, wherein increasing the speed of the input of the clutch increases a speed of a pump arranged to supply the line pressure available to the clutch.

6. A vehicle comprising:
an electric machine;
a clutch configured to be coupled to the electric machine; and
at least one controller configured to increase, in response to slipping of the clutch, a speed of an input of the clutch beyond a threshold speed such that an available line pressure to control the slipping of the clutch is increased.

7. The vehicle of claim 6 further comprising a torque converter including the clutch.

8. The vehicle of claim 7, wherein the at least one controller is further configured to increase a torque input to the clutch to increase the speed of the input of the clutch.

9. The vehicle of claim 8 further comprising an engine coupled to the input of the clutch, wherein the at least one controller is further configured to start the engine to increase the torque input to the clutch.

10. The vehicle of claim 6, wherein the at least one controller is further configured to, in response to slipping of the clutch, reduce a pressure of the clutch to further control the slipping of the clutch.

11. The vehicle of claim 6 further comprising a pump arranged to supply the available line pressure, wherein the speed of the input of the clutch beyond the threshold speed results in a speed of the pump sufficient to generate the available line pressure to control the slipping of the clutch.

12. A method for controlling a vehicle comprising:
by a controller, altering a current to an electric machine coupled to wheels via a locked clutch to alter a torque output of the electric machine; and
by the controller, in response to a slipping of the clutch due to the altered torque output, (i) starting an engine to increase a line pressure available to the clutch and (ii) applying the line pressure to control the slipping of the clutch.

13. The method of claim 12, further comprising, in response to the slipping of the clutch and after the starting of the engine, reducing a pressure of the clutch to further control the slipping of the clutch.

14. The method of claim 12 wherein starting the engine to increase the line pressure available to the clutch increases a torque input to the clutch.

15. The method of claim 14 wherein increasing the torque input to the clutch increases a speed of an input of the clutch.

* * * * *